United States Patent [19]

Publicover

[11] 4,410,576

[45] Oct. 18, 1983

[54] PRE-INKED TAPE

[76] Inventor: Robert L. Publicover, 846 Massachusetts Ave., Arlington, Mass. 02174

[21] Appl. No.: 264,642

[22] Filed: May 18, 1981

[51] Int. Cl.³ .......................... B32B 3/02; B41M 5/00; C09J 7/00

[52] U.S. Cl. .......................................... 428/79; 428/88; 428/89; 428/281; 428/282; 428/343; 428/351; 428/352; 428/354; 428/914; 428/906; 282/19 R; D19/35

[58] Field of Search ............... 428/343, 351, 352, 354, 428/281, 282, 88, 89, 79, 914

[56] References Cited

U.S. PATENT DOCUMENTS

| | | | |
|---|---|---|---|
| 2,626,226 | 1/1953 | Adair | 428/343 |
| 3,135,533 | 6/1964 | Short | 428/79 X |
| 4,082,875 | 4/1978 | Citron | 428/343 |

FOREIGN PATENT DOCUMENTS

| | | | |
|---|---|---|---|
| 660292 | 3/1963 | Canada | 428/79 |
| 55-49291 | 4/1980 | Japan | 428/343 |

*Primary Examiner*—P. Ives

[57] ABSTRACT

Apparatus for the transfer of an outline to a surface including a flexible tape strip having an adhesive surface and a second opposite surface, and ink-bearing means positioned on the second surface.

8 Claims, 5 Drawing Figures

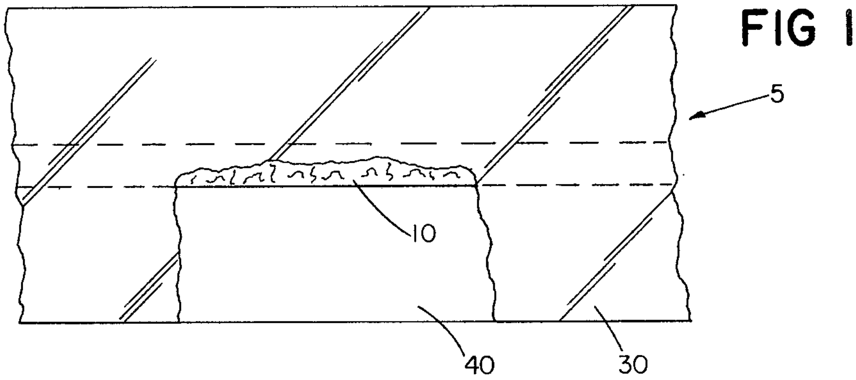
FIG 1
FIG 2
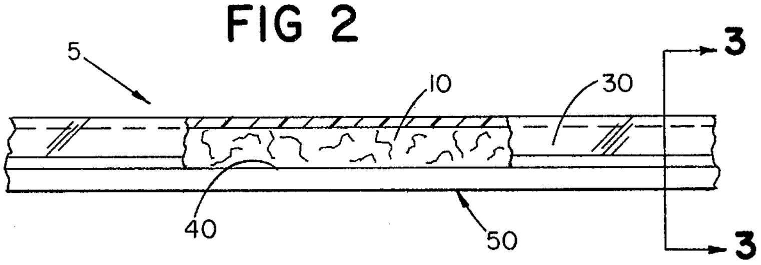
FIG 3
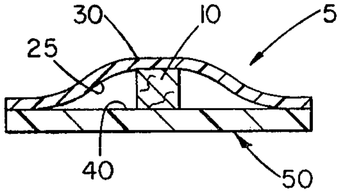
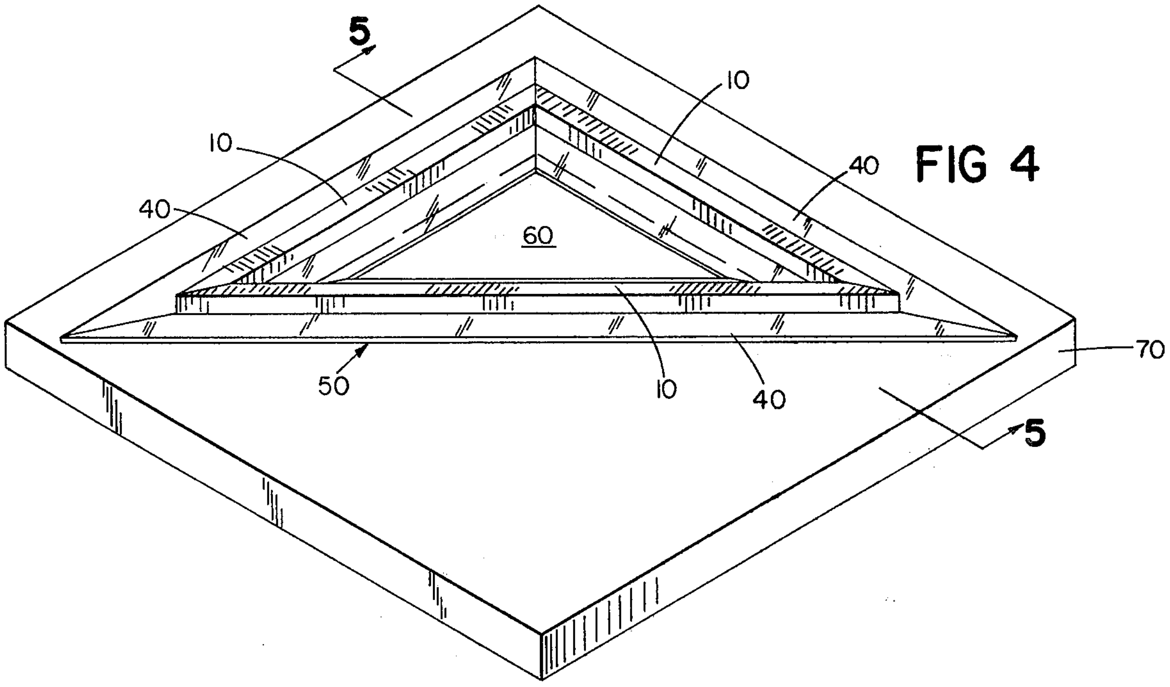
FIG 4
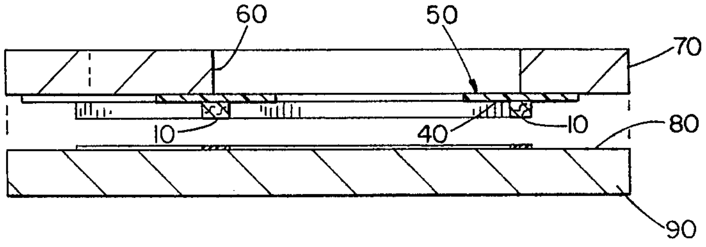
FIG 5

PRE-INKED TAPE

BACKGROUND OF THE INVENTION

This invention relates to transferring designs or other outlines from one surface to another.

Many situations require the transfer of a design or an outline from one surface to another. For example, a carpenter often must duplicate a slot in a board in one or more other boards. This involves first measuring and then drawing the slot, processes which are time-consuming and potentially inaccurate, particularly where curves or non-right angles are involved.

SUMMARY OF THE INVENTION

My invention allows the transfer of any outline to a surface accurately, easily, and inexpensively, and has application in many industries including the building, clothing design, and publishing industries, and is useful in the home as well.

The invention features a flexible tape strip having an adhesive and a non-adhesive surface, and ink-bearing means positioned on the non-adhesive surface.

In the preferred embodiment, the ink-bearing means is a strip attached to the non-adhesive surface and is protected prior to use by means of an overlying strip of protective material.

DESCRIPTION OF THE PREFERRED EMBODIMENT

We turn now to the description of the preferred embodiment, after briefly describing the drawings.

DRAWINGS

FIG. 1 is a plan view of the preferred embodiment of the invention.

FIG. 2 is an elevation, partially broken away, of said embodiment.

FIG. 3 is a sectional view of said embodiment taken along 3—3 of FIG. 2.

FIG. 4 is a perspective view of said embodiment in operation.

FIG. 5 is a sectional view of said embodiment in operation taken along 5—5 of FIG. 4.

STRUCTURE

FIGS. 1–3 illustrate outline transfer apparatus 5. Clear, flexible cellophane protective strip 30 has an adhesive surface 25 which, during storage, adheres it to inked felt strip 10, and to the non-adhesive surface 20 of clear, flexible cellophane strip 40. Felt strip 10 is also attached to surface 20 of strip 40, which strip has on its opposite side a pressure-sensitive adhesive surface 50. Strips 40 and 30 preferably have parallel longitudinal edges and are about 1.5 cm wide, while felt strip 10 is preferably square in cross-section and about 1 mm thick and 1 mm wide.

The apparatus is rolled prior to use for convenient storage.

OPERATION

The transfer apparatus of FIGS. 1–3 is shown, in FIGS. 4 and 5, transferring the shape of triangular slot 60 (FIG. 4) in board 70 to surface 80 of board 90 (FIG. 5). Tape strip 40 is applied from a roll (not shown) to board 70 by cutting three pieces of tape from the roll, one for each side of triangular slot 60, and applying them to the board so that felt strip 10 follows the outline of slot 60 (FIG. 4). Each piece of tape is cut at a slant so that the ends mate to form the triangle. Protective strip 30 (not shown) is then removed, and the two boards are pressed together (FIG. 5) so that inked felt strip 10 transfers the slot outline to surface 80 of board 90.

OTHER EMBODIMENTS

Other embodiments are within the following claims. For example, although strips 40 and 30 are preferably ordinary cellophane, any clear, flexible material can be used.

What is claimed is:

1. Apparatus for the transfer of a design or other outline from a surface (a) to a surface (b) comprising:

a flexible tape strip having a first pressure-sensitive adhesive surface for applying said tape to said surface (a) and a second, opposite surface, and ink-bearing means for transferring a visually noticeable impression onto said surface (b) upon contact, with said surface (b), of said tape strip applied to said surface (a), said ink-bearing means being positioned on said second surface of said tape strip, said transfer occurring when said tape strip is interposed between surface (a) and surface (b).

2. The apparatus of claim 1 wherein said second surface of said tape strip is non-adhesive.

3. The apparatus of claim 1 wherein said tape strip has parallel longitudinal edges, and said ink-bearing means comprises a strip of ink-bearing material that is attached to said second surface of said tape strip and that has longitudinal edges which are parallel with the longitudinal edges of said tape strip.

4. The apparatus of claim 3 wherein said strip of ink-bearing material has a midline that is coincident with the midline of said tape strip.

5. The apparatus of claim 1 further comprising a strip of protective material overlying and in contact with both said tape strip and said ink-bearing means.

6. The apparatus of claim 5 wherein said strip of protective material has a pressure sensitive adhesive surface in contact with said tape strip.

7. The apparatus of claim 5 wherein said tape strip comprises cellophane, said ink-bearing means comprises inked felt, and said protective material comprises cellophane.

8. The apparatus of claim 1, 5, or 6 wherein said apparatus is maintained in a rolled up condition when not in use.

* * * * *